Aug. 30, 1955                A. E. WILLIAMS                 2,716,556
              LEVELING CONTROL FOR AGRICULTURAL MACHINES
Filed June 23, 1954                                    3 Sheets-Sheet 1

INVENTOR
ARTHUR E. WILLIAMS
BY Charles J. Gilean
ATTORNEY

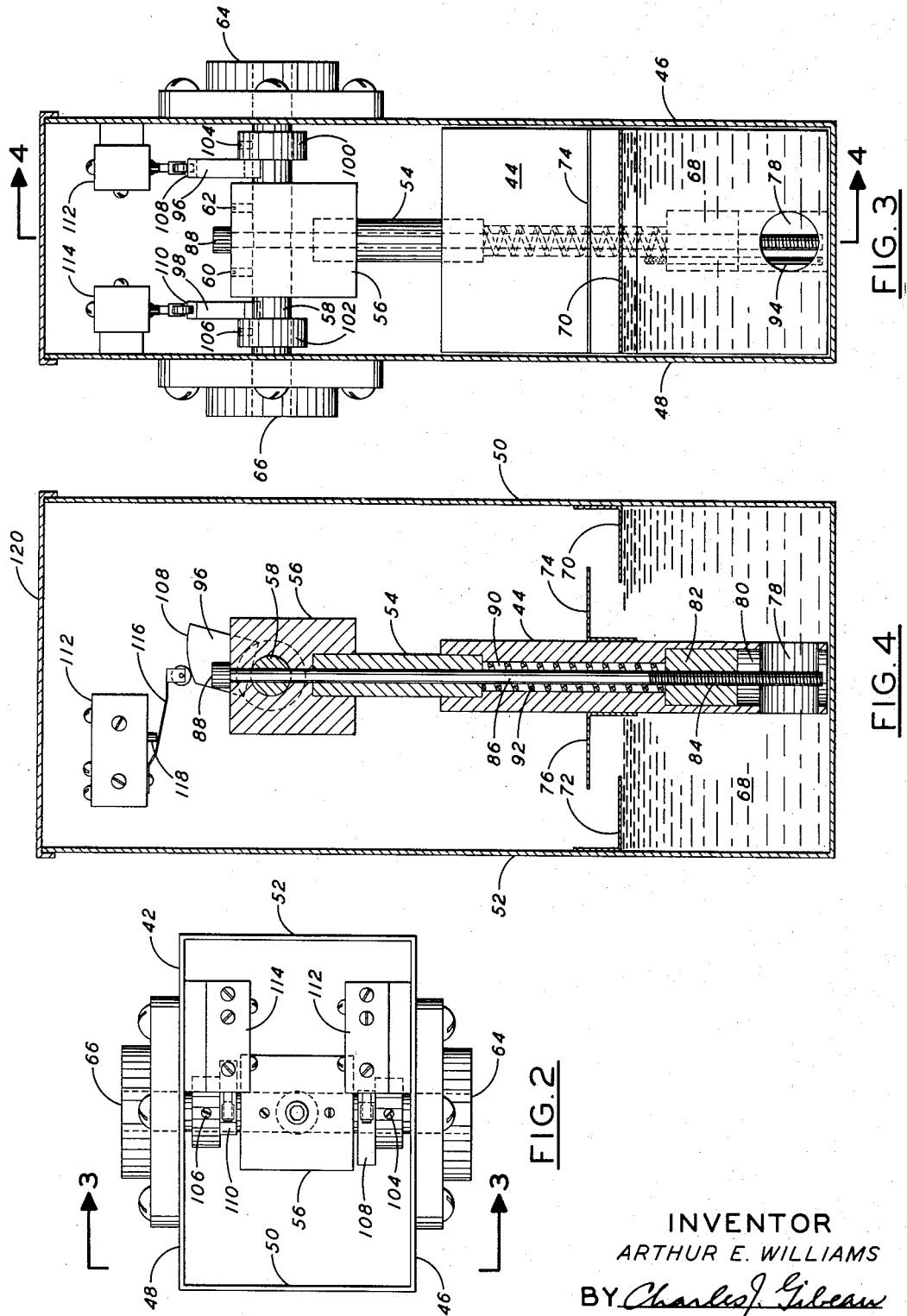

Aug. 30, 1955     A. E. WILLIAMS     2,716,556
LEVELING CONTROL FOR AGRICULTURAL MACHINES
Filed June 23, 1954     3 Sheets-Sheet 3
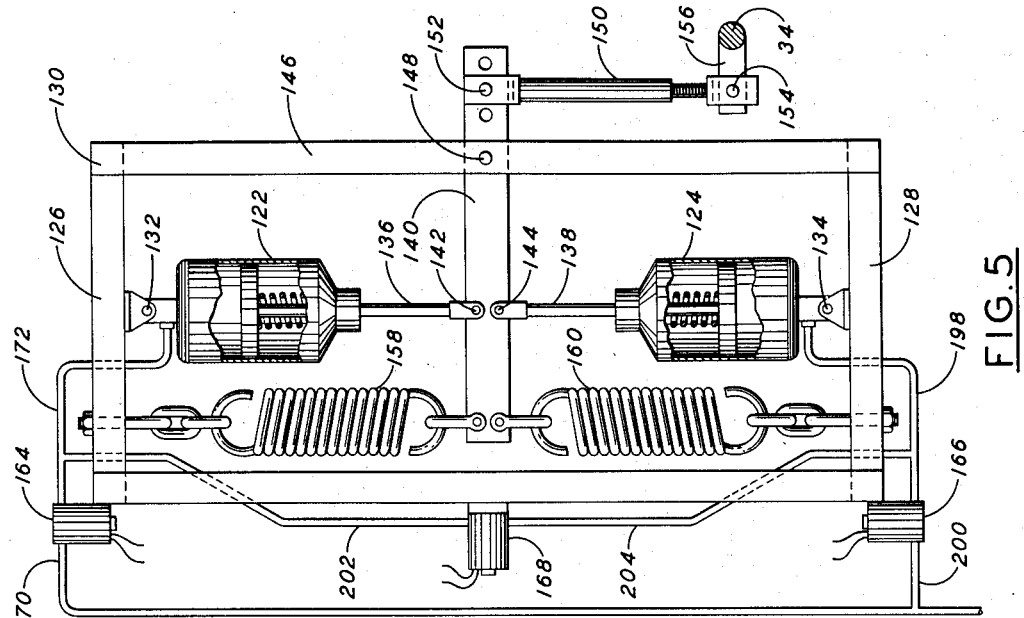
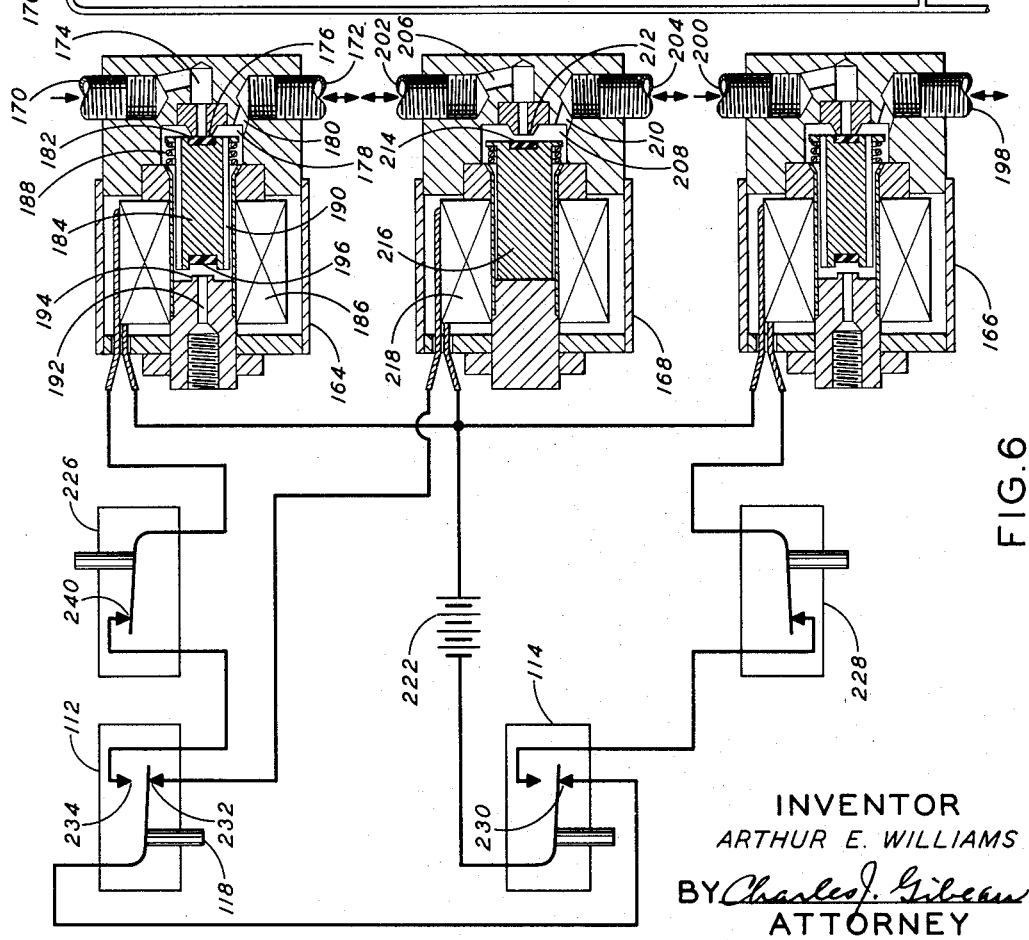
INVENTOR
ARTHUR E. WILLIAMS
BY Charles J. Gibeau
ATTORNEY

United States Patent Office 2,716,556
Patented Aug. 30, 1955

2,716,556

LEVELING CONTROL FOR AGRICULTURAL MACHINES

Arthur E. Williams, Albany, Calif.

Application June 23, 1954, Serial No. 438,789

4 Claims. (Cl. 280—6)

This invention relates to a device for automatically controlling the operation of the leveling mechanism of an agricultural machine, and more particularly to a control mechanism which can be attached to existing types of agricultural machines to replace the manual operations previously required to keep such machines level.

When some types of agricultural machines, for example combine-harvesters, are in use on ground of changing contour, it is desirable that the bed of the machine be maintained level transversely of its direction of motion so that the reaped grain may be evenly distributed over it for proper threshing. Some agricultural machines are equipped with a mechanism which is manually controlled to perform the leveling function. This mechanism may, in instances of interest to the present invention, take the form of a vertically-adjustable supporting or ground wheel for the machine to which is connected a vertically-disposed rack. The rack has an intermeshing pinion which is driven through an appropriate arrangement of gears from a source of power on the machine. A clutch is interposed between the source of power and the gears which will permit control over the operation of them so that the pinion may be made to remain idle while the machine is in operation, or, at the will of the operator, be driven in a forward or reverse direction to drive the rack upwardly or downwardly. The clutch is operated by a rod disposed longitudinally of the machine and along one side of it, where it is supported in appropriate bearings for rotary or rocking motion. A lever connected to the longitudinal rod permits a man to rotate it to one or the other of the various positions appropriate to the pinion action desired so that he may cause the adjustable ground wheel to remain stationary in vertical position or be driven upwardly or downwardly to maintain the bed of the machine level, as the nature of the terrain requires. The manual control of the leveling operation requires substantially the constant attention of an operator to accomplish adequate leveling, yet nevertheless suffers the malfunctions incident to human error.

It is, therefore, an object of this invention to provide a novel mechanism for automatically controlling the position of an adjustable ground wheel on an agricultural machine, the mechanism being adapted to be connected to existing machines to replace the usual manual operation incident to the leveling function of these machines.

A further object of this invention is to provide a novel device for leveling an agricultural machine, which device is sensitive in operation and yet rugged enough to withstand the usage of field operation, and which will automatically control the function of leveling the machine without human attention and thus without human error.

Another object of this invention is to provide for an agricultural machine a control mechanism for the leveling apparatus, which control mechanism comprises a fluid-damped pendulum which is sensitive to transverse angular displacement of the bed of the machine to initiate the operation of electrical switches and electrically-operated pneumatic valves to cause pneumatic motors to be operated in an appropriate predetermined manner to govern the operation of the leveling apparatus.

Other objects and advantages of the invention will become apparent as the description of the invention proceeds in conjunction with the accompanying drawings, which illustrate one preferred embodiment of it.

In the drawings:

Fig. 2 is a partial plan view of the control pendulum assembly and illustrates some of the arrangement of parts within the pendulum case.

Fig. 3 is an elevational view, partly in section, taken along the plane 3—3 of Fig. 2 and further illustrates the arrangement of parts within the pendulum case.

Fig. 4 is an elevational view, partly in section, taken along the plane 4—4 of Fig. 3 and illustrates some details of construction of the pendulum element.

Fig. 5 is an elevational assembly view, partly schematic and partly in section, which illustrates the cooperative relationship between the pneumatic valves, pneumatic power cylinders, and the restoring springs of the invention.

Fig. 6 is a schematic sectional view illustrating the cooperative relationship between the electrical switches and pneumatic valves used in the invention.

Figure 1:
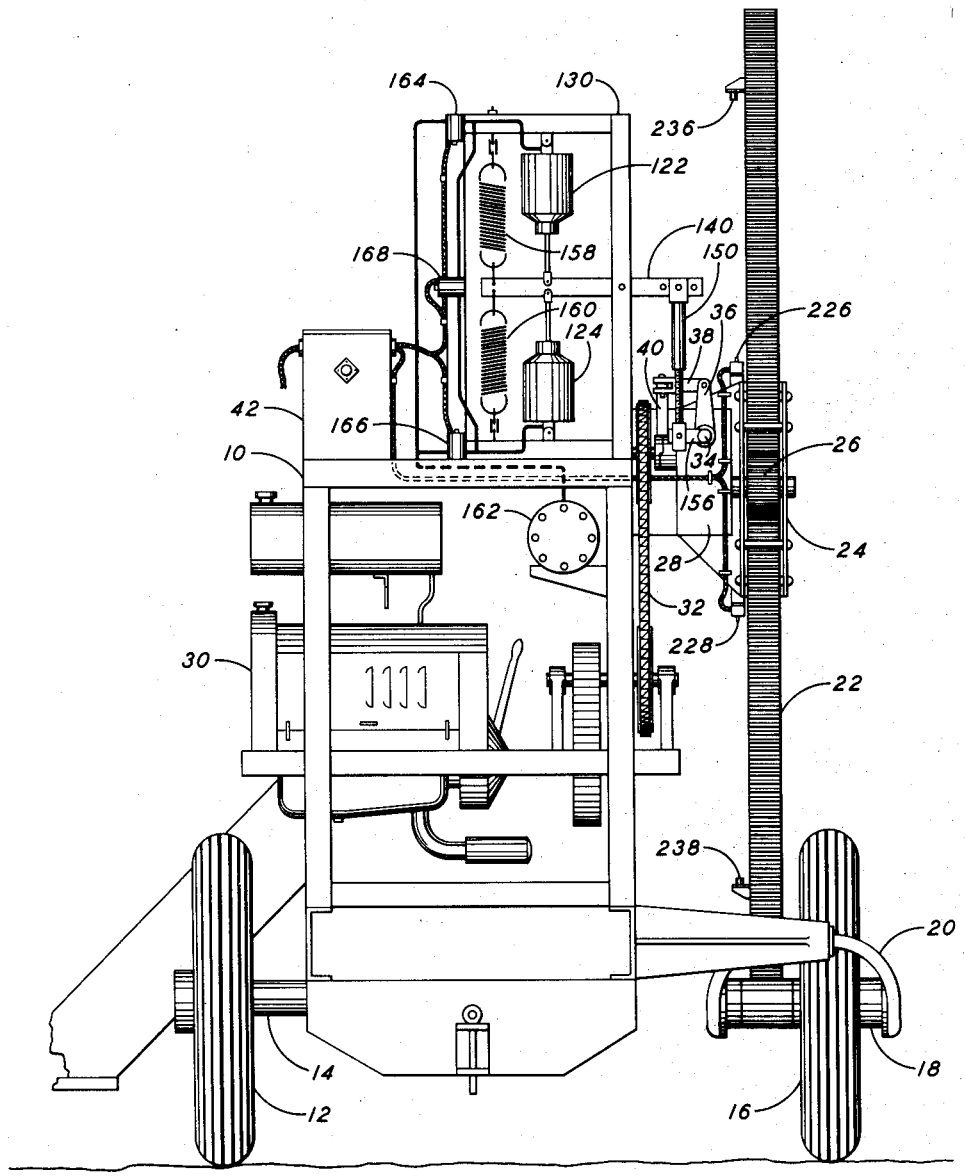
Fig. 1 is a view in elevation of a simplified representation of a portion of a combine harvester on which are mounted the mechanisms of this invention, and illustrates the manner in which the invention is assembled to the machine.

Referring to the drawings, Fig. 1 represents a conventional type of agricultural machine 10, in this case a combine harvester, to which the present invention has been applied. The machine is supported on a ground wheel 12 which is rotatably mounted on a relatively fixed axle 14, and a leveling ground wheel 16 which is rotatably mounted on an axle 18 supported by a member 20 which is attached to the machine in a manner to permit the wheel 16 to be adjusted in vertical position. A rack 22 is connected at one end to the assembly which supports wheel 16 and is slidably mounted in guides 24 affixed to the machine so that it may slide generally vertically relative thereto. A pinion 26 meshes with the rack and is driven through a gear box 28 from a source of power 30, which is a normal component of the machine, through the intermediary of a power transmission means 32. The gear box 28 has included in it a clutch which can be shifted to cause the pinion to be driven alternatively in a forward or a reverse direction or to be placed in a neutral position at the will of the operator. In the neutral position of the clutch, the pinion will lock the rack in the position it previously was adjusted to, thereby holding the leveling wheel in its adjusted position. The operation of the clutch is controlled by the motion and position imparted to a rotatable rod 34, the motion being transmitted through linkages 36, 38 and 40 to the appropriate components of the gear box. In conventional machines, the rod 34 has a lever attached to it which can be grasped by a man to rotate and position the rod to give the desired response of the pinion to place the leveling wheel in a desired position, all of which is well known to the art.

The present invention provides a means for operating the control rod 34 automatically and with greater precision than can be realized by a human operator, accomplishing not only a better job of leveling the machine but freeing the operator for other duties.

In conformance with the concept of this invention, there is rigidly mounted on a normally level part of the machine 10 a pendulum supported within a case 42. The pendulum is mounted to swing transversely of the direction of forward motion of the machine so that a tilt of the machine in a transverse direction will cause a relative displacement between the pendulum and its case. This relative displacement initiates the control function which eventually will cause the machine to be leveled, as will be described hereinafter.

The pendulum case 42 is substantially rectangular in cross-sectional plan, Fig. 2, and the mass 44 of the pendulum is proportioned to fit within the case so that it will approach closely, but without touching, two opposed sides 46 and 48 of it and the bottom of the case but will be free to swing between the alternate two opposed sides 50 and 52, as can be seen in Figs. 3 and 4. The effective mass of the pendulum is rigidly affixed by an element 54 to a block 56 which has a longitudinal opening formed in it to receive a shaft 58. The shaft 58 is secured to the block 56 in any appropriate manner, as by set screws 60 and 62, so there will be no relative motion between the various pendulum elements.

The shaft 58 extends transversely across the pendulum case and is supported in anti-friction bearings 64 and 66, which are secured to the upper portions of sides 46 and 48, respectively, in a manner to permit the pendulum to swing within the case.

The lower portion of the pendulum case is preferably filled with a damping liquid of selected viscosity, such as mineral oil, as indicated by reference numeral 68, Figs. 3 and 4. Baffles are provided to restrain the liquid from splashing about in the case to effect the desired action of the pendulum or create spurious signals of machine displacement. Thus, baffles 70 and 72 affixed to casing sides 50 and 52, respectively, cooperate with complementary baffles 74 and 76 attached to pendulum mass 44. The baffles, which extend the full width of the pendulum, are interposed so that they will not interfere with the movement of it. The liquid thus confined provides a damping effect on the pendulum and prevents it from oscillating or hunting about its vertical position, or from being undesirably sensitive in following rapidly-changing angular displacements of the machine which might be caused by minor and immaterial unevenness of the ground.

The pendulum mass 44 has an opening 78 formed through the lower portion of it in the direction of its thickness, which is also in the direction of the swing of the pendulum, as can be seen in Figs. 3 and 4. This opening permits the fluid which fills the lower portion of the pendulum case to flow from one side of the pendulum to the other as the pendulum swings relative to the case. Means are provided for controlling the size of opening 78 to thereby control the rate of action of the pendulum, in a manner to be described.

The pendulum mass is provided with a vertical, internal cylindrical bore 80 which intersects the opening 78 and has a diameter substantially equal to the width of the opening. A cylindrical plug 82 is slidably mounted in the bore, and is so disposed that it can be made to slide across and obstruct the opening 78 in an adjustable and controllable manner.

The plug 82 has a screw-threaded opening 84 extending through its vertical axis to engage the complementary screw threads of an adjusting member 86 which extends vertically through appropriate centrally-located bores in the pendulum parts to emerge at the central portion of the top face of block 56, where it terminates in a head 88 adapted to receive a tool for rotating it. A portion 90 of the vertical bore in pendulum mass 44 is made of sufficient diameter to receive a helical spring 92 which bears in compression on the top of plug 82 to assure that the plug will be moved downwardly across the opening 78 when the adjusting member 86 is properly rotated. A stationary guide 94 is placed parallel to the direction of motion of the plug and slidably engages the plug 82 to prevent it from rotating and to force it to move longitudinally of its bore 80 when the adjusting member 86 is turned. From this arrangement of parts, it will be apparent that the plug 82 can be employed to reduce the size of opening 78 and thereby decrease the rate at which fluid can flow from one side of the pendulum to the other. This adjustment permits control of the rate of response of the pendulum to a change in the angular attitude of the agricultural machine and, hence, affects the sensitivity of the pendulum. It will be clear that slowing down the rate of response of the pendulum will not affect the ability of it to achieve a vertical position and hence exert a full control function, but affects merely the interval of time in which full control takes place.

The relative position of the pendulum to its case is employed through the intermediary of cams and electrical switches to generate the signals necessary to initiate the leveling function. Two cams 96 and 98, Figs. 2 and 3, are affixed to the shaft 58, one cam being disposed on each side of the block 56. The cams may be mounted on the shaft by forming their base portions with collars 100 and 102, respectively, in which the shaft is received in a rotatable manner and then affixing the collars to the shaft by means of set screws 104 and 106, respectively. This construction permits the cam to be mounted on the shaft so that the positions of the cams can be adjusted for proper operation of the device. Obviously, other arrangements of parts may be employed for this purpose without departing from the spirit of this invention.

Each cam has a peripheral camming surface 108 and 110, respectively, of increasing radius from the center of rotation of shaft 58, and the cams are disposed on the shaft in a mutually reversed manner so that the lift of each cam will be effective in relation to a point above the shaft in a manner opposite to that of the other cam as the shaft is rotated in a given direction. An electric switch is rigidly mounted on the side of the pendulum case above each cam, switch 112 being mounted above cam 96, and switch 114 above cam 98. These switches may be of the sensitive micro-switch type wherein a cantilever spring 116, Fig. 4, is actuated by the cam to displace a cooperating element 118 in the switch to cause electrical contact to be made or broken. Obviously, switches of other forms than those specifically represented in the drawings will also serve the purposes of this invention. The switches are mounted in relation to their respective cams so that as one cam is being rotated in a manner to actuate its complementary switch, the other switch will not be actuated. When the pendulum is in a central position with respect to its case, neither switch is actuated.

The pendulum case may be closed by a cover 120 to prevent foreign matter from entering it and interfering with the operation of the device.

Referring now to Figs. 1 and 5, the ultimate mechanism used to actuate the control rod 34, comprises a pair of opposed power cylinders 122 and 124 which are pivotally mounted respectively on the top member 126 and the bottom member 128 of a frame 130 by pins 132 and 134. Frame 130 is securely affixed to the machine 10. The piston rods 136 and 138 extending from the respective power cylinders are pivotally connected to a lever 140 by pins 142 and 144, and the lever is pivotally supported in the side 146 of the frame by pin 148. An end of the lever extends outwardly beyond the pivot point in the frame and to this end of the lever a link 150 is pivotally connected by pin 152. The link may be made in two telescoping parts which are adjustably screw-threaded together so that the length of the link can be adjusted to make it conform in the most desirable manner to the position of the control rod 34 on the particular machine on which the device is mounted. The other end of link 150 is pivotally connected by pin 154 to a lever 156 which is rigidly secured to control rod 34. Thus, as the lever 140 is tilted upwardly or downwardly by the action of the power cylinders, the lever 156 will likewise be displaced, causing the control rod 34 to be rotated in a forward or reverse direction. As has been stated heretofore, this operation of the control rod will actuate a clutch mechanism in gear box 28 which controls the operation of pinion 26 and, hence, the position of leveling wheel 16.

An opposed pair of helically-coiled restoring springs 158 and 160 are flexibly mounted within the frame 130 with one spring positioned between the top member 126 and lever 140 and the other positioned between the bottom member 128 and lever 140 in positions parallel, respectively, to power cylinders 122 and 124, as illustrated in Fig. 5. The restoring springs tend to hold the lever 140 in centralized or neutral position comparable to that which it will maintain when the agricultural machine is level. If the lever is pivoted about pin 148, one or the other of the springs will be placed in tension to bias the lever back to the neutral position, and finally to aid in causing it to return to neutral when the operation of the power cylinders permits it.

The power cylinders may be operated by any appropriate fluid under pressure, either liquid or gaseous. In the exemplary embodiment of the invention illustrated and described herein, the power cylinders are assumed to be operated by pressurized air. The air may be obtained from any appropriate source, such as an air accumulator 162 mounted on the agricultural machine, and the flow of it to the power cylinders is controlled by solenoid-actuated, multiple-flow air valves in a manner to be explained hereinafter.

A three-way valve 164 is connected in the air line between the accumulator and power cylinder 122, and a similar three-way valve 166 is connected in the line of cylinder 124. A two-way valve 168 is connected between the power cylinders, the connection being in the air lines in locations between the three-way valves and the cylinders.

The specific operations of the valves will be explained with reference to the cross-sectional representations of Fig. 6. Three-way valve 164 has a conduit 170 connecting it with the source of pressurized air, and a conduit 172 connecting it with power cylinder 122. A passage 174 in the valve body communicates with conduit 170, and the passage continues through valve seat 176 to chamber 178. A second passage 180 communicates with the chamber and conduit 172. The valve seat is adapted to be engaged by a plug 182 to close off passage 174 from chamber 178. The plug is formed integral with armature 184 which is slidably mounted axially of a solenoid coil 186 so that when the coil is energized, the plug is withdrawn from valve seat 176 and conduit 170 is in communication with conduit 172 through passage 174, chamber 178 and passage 180. With the coil energized, pressurized air can flow from the accumulator to the power cylinder to cause the latter to be actuated. A compression spring 188 is located in chamber 180 between the armature and the body of the valve in a position to hold the armature extended from the coil and the plug 182 against seat 176 when the coil is not energized. Therefore, normally the valve is in a closed condition.

Longitudinal passages 190 are formed in the armature to provide communication between chamber 178 and a passage 192 which vents to the atmosphere. Passage 192 has a valve seat 194 formed in it and positioned to be engaged by a plug 196 formed integral with the armature on the opposite end from plug 182. When the solenoid is energized and the armature is retracted into the coil, the plug 196 will engage seat 194 to close off the passage to the atmosphere. When the solenoid is de-energized and the plug 182 engages valve seat 176, the conduit 172 will be in communication with the atmosphere through chamber 178 and passages 190 and 192. Hence, it will be apparent that valve 164 can operate to admit pressurized air to the power cylinder, to close off the pressurized air and to vent the power cylinder to the atmosphere to relieve pressure from it.

The similar valve 166 is connected to power cylinder 124 by conduit 198 and to the source of pressurized air by conduit 200, and operates in a manner identical to that described above for valve 164. However, as will be explained later, only one of these valves can be open at any given time to admit pressurized air to its respective power cylinder, and in the equilibrium position both valves are closed simultaneously.

The two-way valve 168 has only an open or a closed condition and does not vent to the atmosphere as do the three-way valves already described. This valve is connected by conduit 202 to conduit 172, and by conduit 204 to conduit 198. The conduits communicate through the valve body by passage 206, chamber 208 and passage 210. A valve seat 212 located between passage 206 and chamber 208 is adapted to be closed by a plug 214 formed integral with armature 216 which is slidably mounted axially of coil 218. When the coil is energized, the armature will be drawn into it to unseat the plug 214 from valve seat 212 and place conduit 202 in communication with conduit 204. A helical compression spring 220, located in the chamber 208 and positioned to act between the armature and the valve body, holds the valve closed when the coil is not energized. The two-way valve is normally open when the apparatus is in equilibrium, to interconnect the air conduits 172 and 198 so that the air pressure in the power cylinders will be equal and the lever 140 will be in its median position.

The solenoids of the air valves may be energized from an appropriate source of electrical power, such as battery 222, which may suitably be mounted on the agricultural machine. The electrical circuit which controls the operation of the valves has in it the pendulum-actuated micro switches 112 and 114, described heretofore, and two limit switches 226 and 228, Figs. 1 and 6, which are located on the machine 10 in positions to be actuated respectively when the rack 22 reaches the bottom and top of its permissible travel. The actuation of a limit switch will cut off further operation of the rack drive, which will then hold the leveling wheel at its position of maximum adjustment until the contour of the ground becomes such that the leveling mechanism can again function within its physical limits, at which time the leveling device of this invention automatically again will become operative to continue its control, in a manner to be explained hereinafter.

Within the limits of operation of the rack, that is, before either limit switch is actuated, the micro switch 112 exerts principal control over valve 164, and micro switch 114 exerts principal control over valve 166. Valve 168 is controlled by both micro switches.

When the pendulum is in a neutral position, that is when machine 10 is level, the positions of the switches and valves will be as depicted in Fig. 6. In this position, neither cam of the pendulum control is actuating its respective micro switch, so that neither of the solenoids of the three-way valves is energized and both of these valves are closed. However, the circuit to the coil of two-way valve 168 is completed from battery 222 through contact 230 of switch 114 and contact 232 of switch 112 to open this valve and place the power cylinders in communication with each other.

The corresponding similar parts of the device will operate in an identical manner to cause the leveling wheel 16 to move alternatively and appropriately in an upwardly or a downwardly direction, whichever is required to bring the agricultural machine to level. Therefore, a sequence of operations required to level the machine from a displacement in one direction will be described in detail, and it is believed it will be clear without additional explanation what the sequence of operations would be for leveling from a displacement in the opposite direction.

If we now assume that machine 10 is displaced from the level position in a direction to cause cam 96, Fig. 4, to act against spring 116 to depress element 118 of switch 112, it will be seen in Fig. 6 that contact 232 will be broken and contact 234 will be made. The circuit to the coil 218 of valve 168 will then be open and the coil will be de-energized, causing the two-way valve to close. Substantially simultaneously, the circuit from battery 222 to coil 186 of valve 164 will be completed through contact 230 of switch 114 and contact 234 of switch 112 to cause valve 164 to open to admit pressurized air to power cylinder 122. As the piston of this cylinder thrusts relatively downwardly to tilt lever 140, restoring spring 158 will be extended and the piston of power cylinder 124 will be forced relatively upwardly in its cylinder. Since cylinder 124 is at this time vented to the atmosphere through valve 166, it will not retard the motion of the power stroke of cylinder 122.

The displacement of lever 140 will rotate control rod 34, causing the clutch in the gear box to be shifted into engagement to drive rack 22, and hence leveling wheel 16, in a direction which will cause the machine to assume again a level position. As the machine approaches level, cam 96 exerts continuously less effect on spring 116 until finally, when the level position is achieved, element 118 is fully retracted, contact 234 is broken, and contact 232 is made. When this happens, valve 164 becomes closed, cutting off pressurized air from power cylinder 112 and halting its drive. Substantially simultaneously, valve 168 opens, interconnecting the air lines of the power cylinders. Pressurized air from cylinder 122 therefore flows into cylinder 124, causing the latter to assist the restoring spring 158 in tilting lever 140 back to its neutral position. As the lever moves to neutral, rod 34 simultaneously is rotated to shift the gear box clutch to neutral, thereby cutting off the pinion drive. The gear box is constructed so that the gears cannot be driven in reverse from the rack end, and thus when the pinion drive is stopped, the rack will be held locked in whatever position it has attained. Thus, the machine will maintain its level position until the slope of the ground again changes, at which time the pendulum will again be relatively displaced in its case and the sequence of operations previously described automatically will take place to bring it back to level.

If the machine has encountered a slope of sufficient angle so that the rack is driven to its limits of operation without being able to restore the machine to level, one of the limit switches 226 or 228 will be actuated by a complementary abutment member 236 or 238, respectively, affixed to the rack to cut off the rack drive. It is apparent that the limit switches may be located to be actuated by a part of the mechanism other than the rack to achieve the same result. Assume the conditions set forth hereinbefore wherein micro switch 112 was actuated to energize valve 164 causing power cylinder 122 to be operated, and further assume that rack 22 is driven downwardly under these conditions but that the slope of the ground is too great to permit the machine to be leveled within the limits of rack travel. Referring to Fig. 1, it will be seen that when the rack reaches its limit of downward travel, the abutment member 236 will actuate limit switch 226. This will open contact 240, Fig. 6, to break the electrical circuit to valve 164, causing this valve to close and stopping the flow of pressurized air to power cylinder 122. Also, when valve 164 closes, power cylinder 122 is immediately vented to the atmosphere through it, permitting the power cylinders to equalize and the gear box clutch to be shifted to neutral. The rack and leveling wheel will be held in the position of maximum extension until the angle of slope becomes less and within the range that the leveling mechanism can adjust to. When this happens the agricultural machine, because of the fully-extended leveling wheel, will be tilted out of level in the direction relatively opposite to that of the first instance, and the pendulum will be relatively displaced in the opposite direction. Under these conditions, micro switch 114 will be actuated to operate valve 166, admitting pressurized air to power cylinder 124. Lever 140 and control rod 34 will be displaced oppositely from the directions which applied heretofore, to thereby shift the gear box clutch in the direction to cause the pinion to drive the rack upwardly and bring the machine back to level. As the rack is driven upwardly, the abutment 236 releases limit switch 226 and the circuit to valve 164 automatically again becomes potentially operative.

Thus, it will be seen that this invention provides an automatic control which will perform its functions in a positive manner without human attention to keep the bed of the agricultural machine to which it is attached level within the limits of operation of the leveling apparatus thereof, compensating automatically for changes in the angle of slope and changes in the direction of slope, with provision to safeguard the leveling apparatus when it has reached its limits of operation by disconnecting the control mechanism and actuating power from it, but automatically connecting the control mechanism and actuating power to the leveling apparatus when the machine again traverses a terrain with a slope within the effective range of the leveling apparatus.

It will be obvious that modifications, alterations and substitutions can be made in the details of the disclosed exemplary embodiment of this invention without departing from the inventive concept. Therefore, it is desired that the invention not be limited to the specific embodiment employed herein by way of example but be interpreted as embracing all equivalents within the scope of the appended claims.

I claim:

1. A control device for the actuating mechanism of the leveling apparatus of an agricultural machine comprising a pendulum mounted to swing in a case which is rigidly attached to said machine, a liquid in said case and contacting said pendulum to damp the swinging motion thereof relative to said case, said pendulum having an opening of adjustable size formed through it and submerged in said liquid to adjust the effect of the damping liquid thereon, a pair of electric switches mounted in said case and operated alternatively by said pendulum in accordance with the direction of relative angular displacement of said pendulum to said case, a pressure fluid valve connected to each of said electric switches for operation thereby, each said valve being connected to a respective pressure fluid power cylinder to admit a pressure fluid thereto and exhaust a pressure fluid therefrom, said power cylinders being connected in opposed relationship to said actuating mechanism of said leveling apparatus to control the operation of said apparatus in alternative directions in accordance with the relative displacement of said pendulum to said case.

2. A device in accordance with claim 1 in which said power cylinders are interconnected through a third pressure fluid valve which is operatively connected to both of the said pair of electric switches, and which is operated by said switches to be opened to interconnect said power cylinders when the pendulum is in a neutral position relative to its case, and to be closed to disconnect said power cylinders when the pendulum is angularly displaced relative to its case.

3. A control device for the actuating mechanism of the leveling apparatus of an agricultural machine comprising a pendulum mounted on said machine in a position to swing transversely thereof, a pair of electric switches mounted on said machine in a position to be operated alternatively by said pendulum in accordance with the direction of swing of said pendulum relative to said machine, a solenoid-operated pressure fluid valve connected to each of said electric switches for operation thereby, each said valve being operatively connected to a respective pressure fluid power cylinder, a third solenoid-operated pressure fluid valve interconnecting the said power cylinders and connected to both of said pair of electric switches for operation thereby, said switches being arranged to operate said third valve to interconnect the pressure fluid lines to said power cylinders when said agricultural machine is in a level position and to close the connection between said power cylinders when said machine is displaced from a level position, and additional switches connected to the pressure fluid valves to halt the operation of the said actuating mechanism and to return the said control device to a neutral position when said leveling apparatus has reached a limit of operation.

4. A control device for the actuating mechanism of the leveling apparatus of an agricultural machine comprising a pendulum mounted to swing in a case which is rigidly attached to said machine, a liquid in said case and contacting said pendulum to damp the swinging motion thereof relative to said case, baffles interposed between said pendulum and said case to restrain said liquid from splashing about in said case, said pendulum having an opening formed through it in a location below the level of said liquid and positioned to permit said liquid to flow from one side of said pendulum to another side as said pendulum moves relative to said case, a pressure fluid motor operably connected to said actuating mechanism, and means connecting said pressure fluid motor to said pendulum for automatic operation by said pendulum.

References Cited in the file of this patent

UNITED STATES PATENTS

| | | |
|---|---|---|
| 2,397,711 | Vought | Apr. 2, 1946 |
| 2,564,202 | Hanson | Aug. 14, 1951 |
| 2,572,910 | Brown | Oct. 30, 1951 |
| 2,576,816 | Wahlberg | Nov. 27, 1951 |
| 2,583,250 | Ball | Jan. 22, 1952 |
| 2,623,758 | Cruz | Dec. 30, 1952 |
| 2,684,254 | Goss | July 20, 1954 |

FOREIGN PATENTS

| | | |
|---|---|---|
| 818,734 | Germany | Oct. 29, 1951 |